TAPE HANDLER REEL CONTROL SYSTEM

Filed April 14, 1966 5 Sheets-Sheet 1

INVENTORS
ROBERT E. COLE
EDWARD D. WELLE
RAYMOND SOMMERER
CARL C. ROECKS

BY William C. Cahill
ATTORNEY

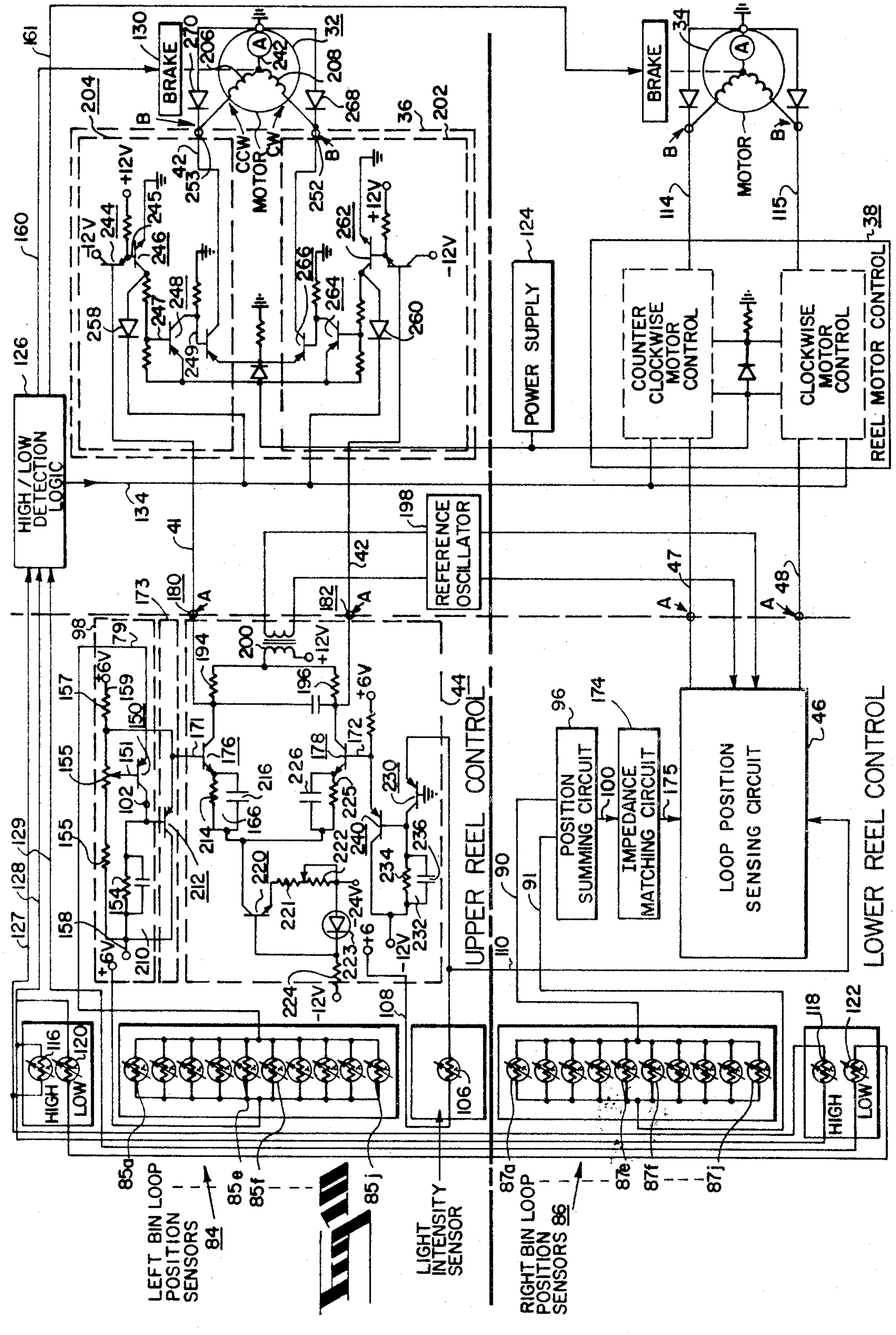
BRAKE
BRAKE
MOTOR
HIGH / LOW DETECTION LOGIC
POWER SUPPLY
COUNTER CLOCKWISE MOTOR CONTROL
CLOCKWISE MOTOR CONTROL
REEL MOTOR CONTROL
REFERENCE OSCILLATOR
UPPER REEL CONTROL
LOWER REEL CONTROL
POSITION SUMMING CIRCUIT
IMPEDANCE MATCHING CIRCUIT
LOOP POSITION SENSING CIRCUIT
HIGH
LOW
LEFT BIN LOOP POSITION SENSORS 84
LIGHT INTENSITY SENSOR
RIGHT BIN LOOP POSITION SENSORS 86

3,400,895
TAPE HANDLER REEL CONTROL SYSTEM
Robert E. Cole, Carl C. Roecks, Raymond Sommerer, and Edward D. Welle, Phoenix, Ariz., assignors to General Electric Company, a corporation of New York
Filed Apr. 14, 1966, Ser. No. 542,617
25 Claims. (Cl. 242—55.12)

ABSTRACT OF THE DISCLOSURE

A control apparatus for a tape transport employing sensors responsive to radiant energy for deriving a signal which is corrected for variations in the quantity of radiant energy supplied and which is representative of a tape loop deviation from a desired reference position.

This invention concerns control systems for tape transports in which a capstan moves the tape from a storage reel through a buffer storage bin past a transducer and through a second buffer storage bin to a take-up reel. More specifically, this invention relates to photoelectric tape quantity sensing and tape reel control apparatus for controlling the reel drive motors to maintain a desired length for buffer loops of tape between the storage reel and the capstan and between the take-up reel and the capstan as needed to compensate for the difference in acceleration and deceleration of the tape by the capstan as compared to the less rapid acceleration and deceleration of the reels.

In tape handlers, such as those employed for magnetic tape transports, it has been found impractical to attempt to start and stop the tape storage reels, at acceleration rates in the order of those of the capstan because of the large mass of the reel relative to that of the capstan. Therefore a quantity of unwound tape is stored in the form of loops of tape in suitable storage bins between a transducer and each tape reel. Because of the slack provided by the loop in each bin and the low mass of the tape in the bin, that portion of tape passing over the transducer can be accelerated and decelerated by a separate capstan more rapidly than by the rotation of the reels.

Since more rapid acceleration of the tape is becoming increasingly important, it is desirable to have larger quantities of unwound tape on either side of the transducer than formerly used with slower tape transports and to have a tape loop position sensing system capable of providing an output signal which is accurately proportional to the position of the tape loop in each bin. Therefore as the speed of operation of a tape transport increases it is necessary to provide more accurate sensing of the amount of tape stored in the bins and to provide improved reel drive control apparatus so as to maintain the tape loop lengths at their required levels.

Tape handler reel control systems normally establish the deviation of tape loop position from a predetermined established reference level in a storage bin by providing an arrangement of photoelectric, pressure, capacitance or collimated light sensing systems. In previously known tape handler reel control systems, the signals from a plurality of sensors which respond to the variations of light, pressure, or capacitance from a source of energy are employed to control the generation of a tape loop position signal which is proportional to the position of the tape loop in the bin. This tape loop position signal then controls circuits which supply drive control signals for energizing the reel motors by an amount which is a function of the change in position of the corresponding buffer loop from an established reference level loop position. The sensors are often sensitive to variations in the intensity or quantity of energy supplied from the source of energy.

Thus, the tape loop position signals may be an inaccurate indication of the position of the loop. It is therefore becoming increasingly important for tape reel control systems to provide corrections for and protection against inaccuracies in the tape loop position signal due to variations in the source of light, pressure, capacitance, sources external to the storage bin, or other physical quantity exposed to the sensors.

Tape loop position sensing systems employing photoresponsive sensors have in the past employed either a plurality of light sources or apertures in the bin walls, collimated light, or mechanically rotating members to provide a light source within the storage bin for exposure to the tape loop position sensors. Additional light sources have been required for abnormal tape loop position excursion limit sensors and duplicate light sources have been required where more than one storage bin is illuminated. In prior art systems, the light has not been continuous and uniformly distributed within the storage bin, therefore additional circuits, light sources or complex physical arrangements have been required to obtain a continuously variable tape loop position signal which accurately represents the change of position of the tape loop in the bin. Applicant's photoresponsive tape loop sensing system on the other hand employs only one light source which provides continuous uniform light throughout two loop storage bins and illuminates both normal and abnormal tape loop position sensors and in so doing provides a more accurate loop position signal.

Control systems for sensing the position of the buffer tape loops in tape transports to obtain control signals for reel motor control become increasingly complex and expensive as the need for improved accuracy increases. The reel motor speed control circuits and reel motor power control circuits in such systems have previously used various types of transducers to establish velocity control signals and switching or firing devices requiring isolation transformers and external signals for turn-off. These circuits have also produced excessive A-C harmonic power in addition to the power supplied to energize the reel motors resulting in excessive reel motor power dissipation. The reel motor speed and power control circuits also become increasingly complicated and expensive as the need for improved control accuracy increases to accommodate more rapid acceleration and deceleration after sudden changes in the loop position signal.

It is therefore an object of the present invention to provide a more accurate tape reel control system.

It is another object of this invention to provide an improved photoresponsive tape loop position sensing system.

It is still another object of this invention to provide a more accurate photoresponsive tape loop position sensing system having a common light source for two adjacent bins, the photoresponsive normal loop position sensors and the photoresponsive abnormal loop position sensors.

It is a further object of this invention to provide an improved tape reel control system having no moving parts for sensing or motor speed control.

It is still a further object of this invention to provide an inexpensive tape reel motor speed control for tape transports utilizing photoresponsive tape loop position sensing.

It is yet another object of this invention to provide a tape reel control system with improved tape reel motor power switching.

In accordance with applicant's invention, a system for controlling the reel motors employs a vacuum tape loop bin between each reel and a capstan. A plurality of photoelectric sensors for sensing tape loop position are provided along one side of each tape bin to respond to light from a single light source which continuously and uniformly illuminates two adjacent loop bins. The same single light source supplies light for separate photoelectric sensors, located near each end of the loop bins, which respond to produce an abnormal tape position signal when the tape loop experiences an excursion beyond the limits of normal tape loop excursion. A single photoelectric sensor is also provided and is oriented so as to respond to the same single light source to produce a light source intensity signal. This signal is used to compensate for light source intensity variations of the tape loop position signal in accordance with the quantity of light exposed to photoelectric sensors along one side of the loop bins.

The plurality of photoelectric sensors for sensing the tape loop position are equally spaced along the lengths of each of the vacuum loop bins so that they respond to provide a continuous output representing the amount of light present at the different sensors. A signal summing circuit is provided for each loop bin which responds to the illumination effects on the photoelectric sensors by the light established below each of the loops to produce a signal which is indicative of the position of the loop in that bin. The photoelectric sensors are connected in parallel such that the signal summing circuit responds to an electrical signal from the parallel network to provide one continuously variable smooth loop position signal when the tape loop is in changing position.

A panel of transparent tinted material forms a front wall of the loop bins to prevent the ambient light from external sources from falsely effecting the photoelectric sensors and to avoid inaccurate loop position signals. The signal representing the actual tape loop position is then applied to a difference amplifier for comparison with a signal representing an established reference level loop position.

A difference amplifier circuit is provided for each vacuum loop bin which is operable to determine the deviation of the actual loop position signal from a predetermined relationship with the established reference level loop position signal for each bin. This deviation results in producing a loop position error signal. The difference amplifier also receives the light source intensity signal from the photoelectric sensor monitor for modifying the established reference level loop position signal. Therefore the loop position error signal is adjusted in accordance with any variation due to light source intensity change.

Since the signal indicative of the position of the loop in its corresponding bin is a continuously variable signal when the tape loop is changing position, the difference amplifier includes a circuit for responding to the rate of change of the position signal. The circuit responds to the loop position signal to modify the loop position error signal in accordance with the loop position rate of change. During certain periods of operation, the rate of change response modifies the loop position error signal such that it prevents the loop position error signal from changing too rapidly during periods when the tape loop is rapidly changing position. The modified loop position error signal then controls the reel motor control circuits for more rapid deceleration of the reel motor to provide automatic electrical damping. During certain other periods when the tape loop is rapidly changing position, the rate control signal allows the loop position error signal to change more rapidly than it would normally change in response to the loop position signal. The modified loop position error signal then controls the reel motor control circuits for more rapid acceleration of the reel motor.

In order to convert the loop position error signal into a frequency and amplitude varying signal for controlling the reel motor, a reference oscillator is coupled into the difference amplifier to modulate the loop position error signal by a predetermined frequency and amplitude. The modulated loop position error signals for each vacuum loop bin are then applied to a motor power control circuit to energize the motors driving the tape reels associated with each of the vacuum loop bins individually in the direction and the amount to substantially eliminate the deviation of the actual tape loop position from its established reference level position. The modulated loop position error signal is applied to the motor power control circuit, which is biased to operate at a predetermined threshold signal value and serves as a high frequency switch for applying D-C power to a motor. Since the motor power control circuit is biased to a predetermined threshold value, the switch is operated only for those portions of the cycle when the amplitude of the modulated error signal exceeds the threshold value. This provides for applying power to the motor in the form of pulses of variable width as the loop position error signal varies in magnitude and polarity. The loop position error signal, which is amplitude modulated by a predetermined alternating $\pm$ amplitude, is changing in magnitude and polarity when the tape loop position changes with relation to its desired established tape loop reference level position. This deviation provides a loop position error signal which has a variable amount of positive and negative portions of each cycle. The D-C reel motor associated with each vacuum loop bin responds to the average value of the pulses to energize the reel motors for operation in the direction and amount necessary to move the tape loop to the established tape loop reference level position.

In the event that the reel motors are unable to position the tape loops within their normal tape excursion limits, the sensors responding when tape loop excursions are beyond the limits of normal tape loop excursion provide abnormal tape loop position control signals. The abnormal tape loop position signals activate abnormal tape loop position alarm circuits which apply mechanical brakes to the reel motors and prevent the motor control circuits from applying power to the reel motors.

The subject matter of the invention is particularly pointed out and distinctly claimed in the concluding portion of the specification. The invention, however, both as to organization and operation may best be understood by reference to the following description in connection with the accompanying drawings, in which:

Figure 1:
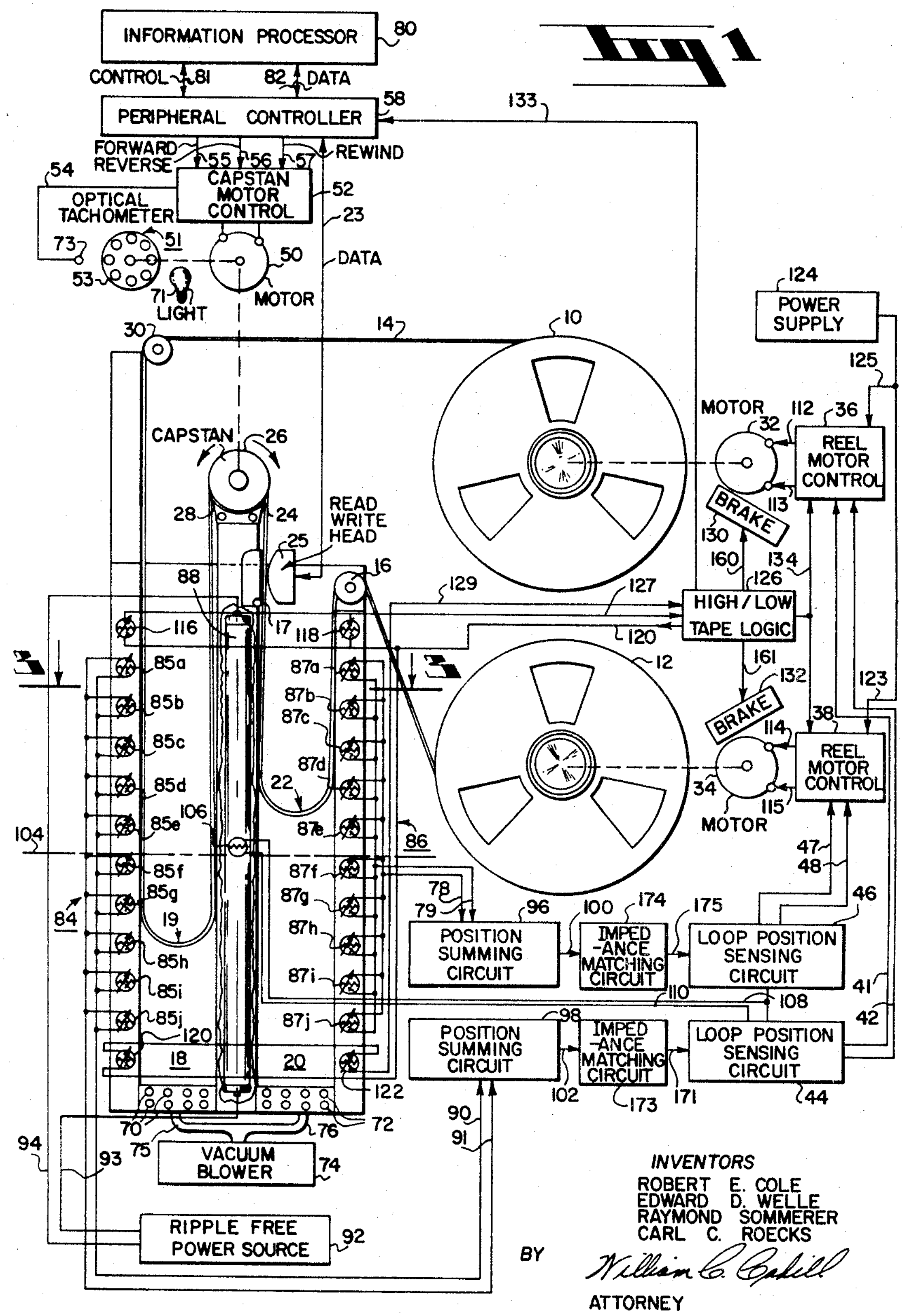
FIG. 1 illustrates in block diagram form an exemplary arrangement of a tape handler reel control system according to this invention.
Figures 2, 3, 4, 5, 6:
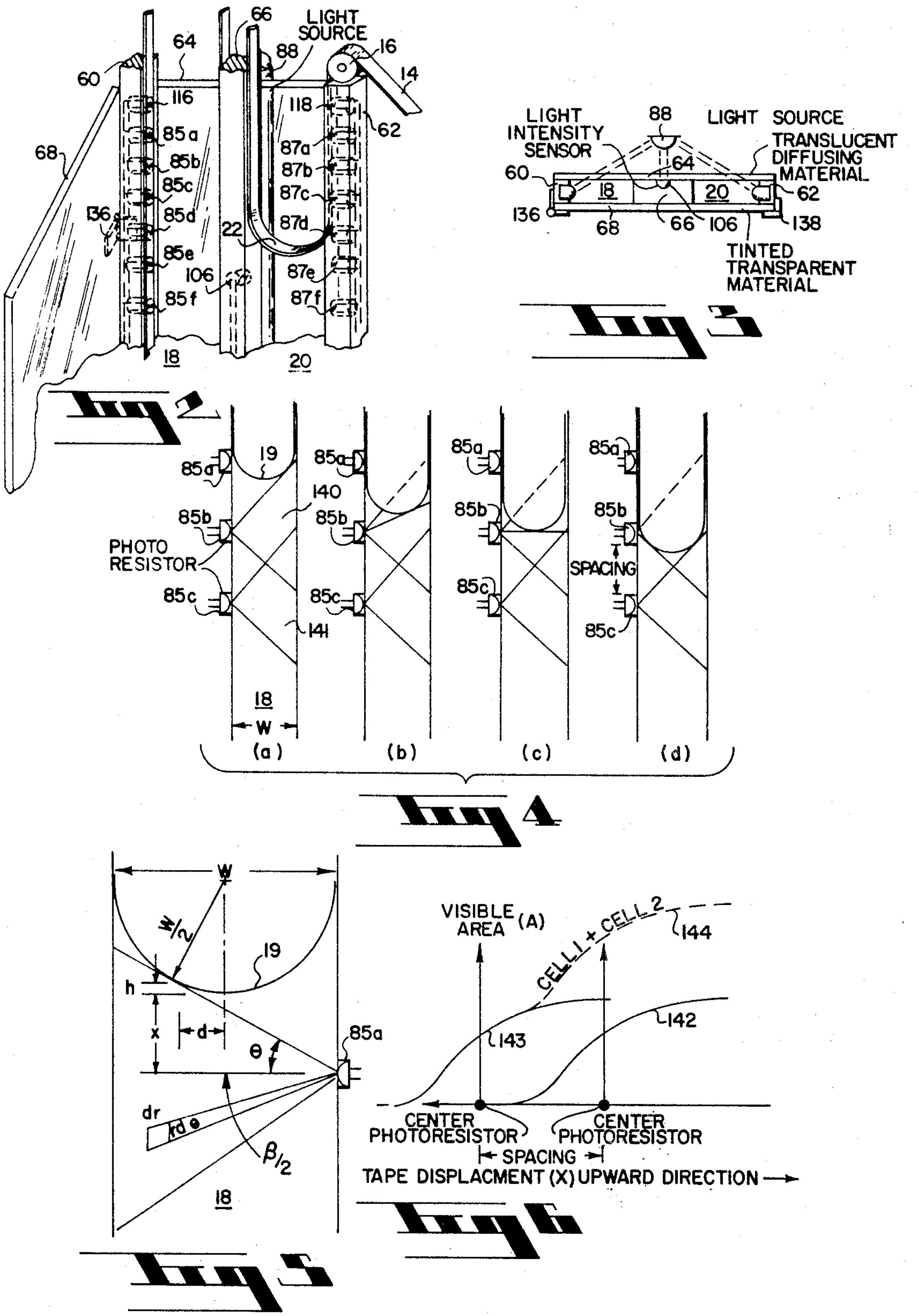
FIG. 2 is an enlarged fragmentary perspective view of the tape loop vacuum bins shown in FIG. 1.
FIG. 3 is a sectional view taken on the line 3—3 of FIG. 1, showing the light source, light source photosensitive sensor, light diffusing member, and transparent tinted front wall of the tape loop vacuum bin of FIG. 1.
Figure 7:
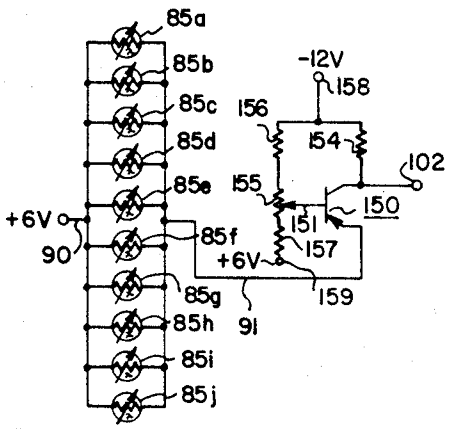
Figure 8:
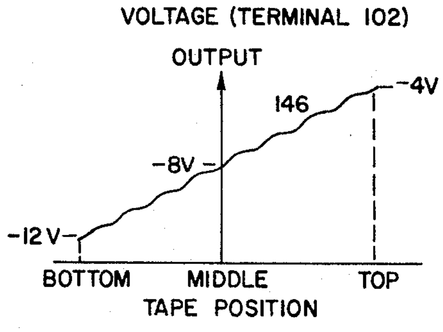
Figure 9:
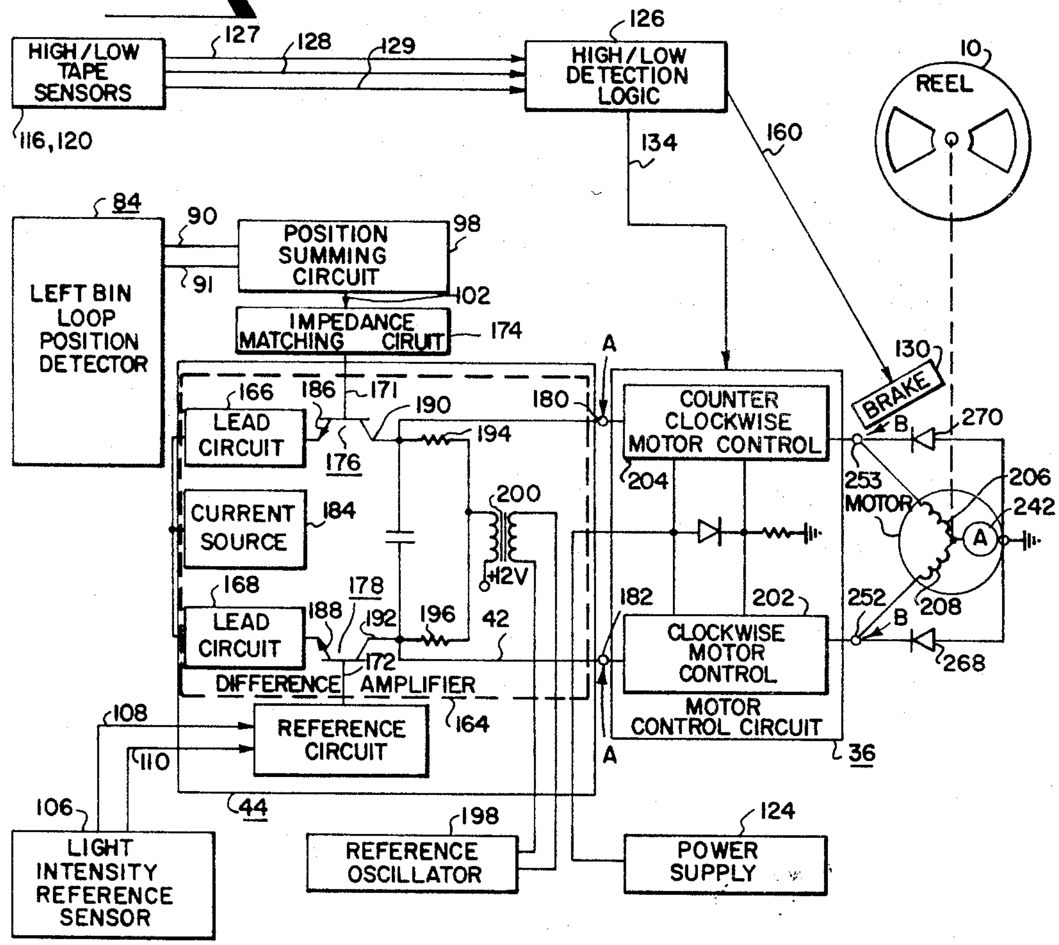
Figure 11:
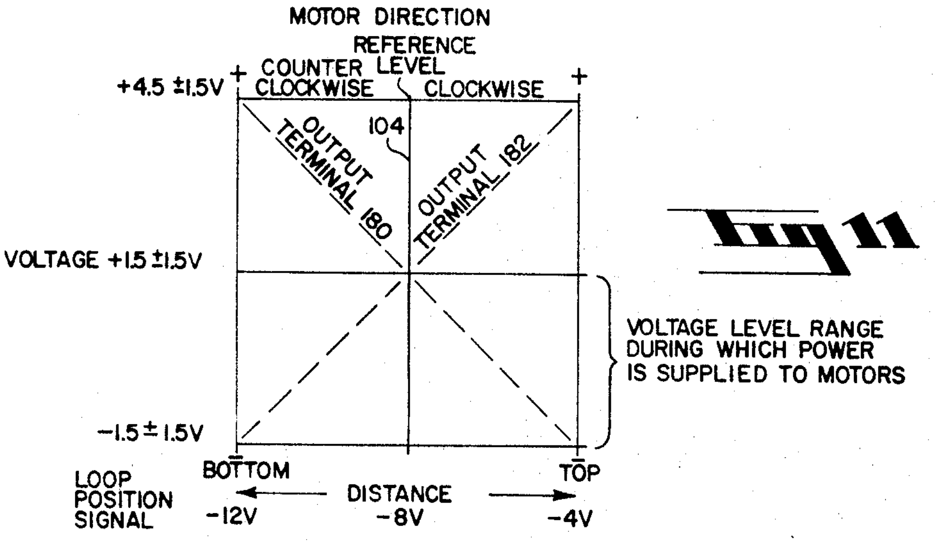
Figure 12:
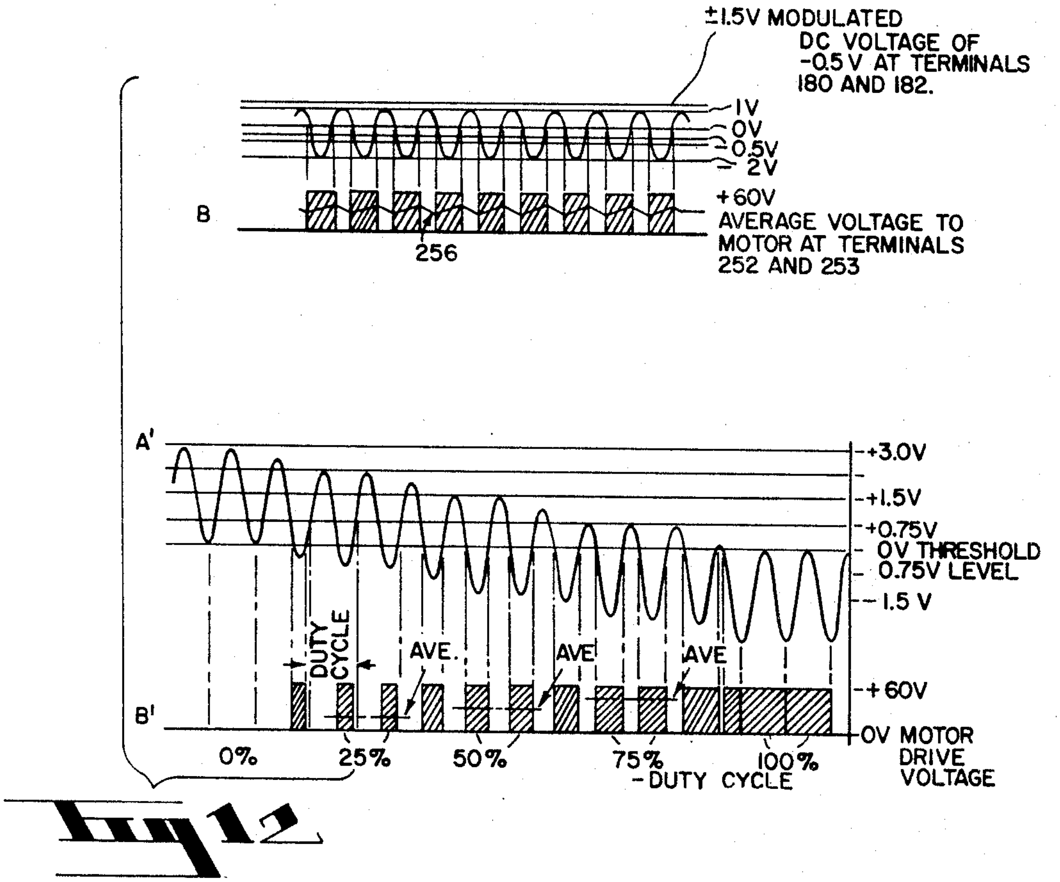

FIGS. *4a–4d* are fragmentary elevation views of the front of the vacuum bin showing the tape loop in various positions with respect to the illumination areas visible to two typical photoresponsive sensors;

FIG. 5 is an enlarged fragmentary front view of one of the loop bins defining terms of equations used in the specification;

FIG. 6 shows curves illustrating the change in visible area for two typical photosensitive sensors in response to tape loop position change;

FIG. 7 is a schematic diagram of the tape position summing circuit;

FIG. 8 is a curve of the response characteristics of the circuit shown in FIG. 4;

FIG. 9 is a diagram, partially in block and partially in schematic form showing in greater detail the tape loop position sensing system and the motor control portions of the systems illustrated in FIG. 1;

FIG. 10 is a schematic diagram of the tape reel control circuits of FIG. 9 for the upper reel control and a block diagram of the lower reel control;

FIG. 11 is a graph of the relations between the tape loop position and the control voltages;

FIG. 12 shows waveforms of the difference amplifier outputs at terminals 180 and 182 of FIGS. 9 and 10 and the output voltage to the reel drive motors at terminals 252 and 253 of FIGS. 9 and 10.

With reference to FIG. 1 the invention is described for a tape transport system utilizing a supply reel 12 and a take-up reel 10. The tape 14, which in the described embodiment may be a magnetic tape of the type generally used in storing digital information, follows a particular path from supply reel 12 over roller 16 into vacuum loop bin 20 to form loop 22. From vacuum loop bin 20, tape 14 follows a path over pin guide 17 past transducer 25 over stationary ramp guide 24 over capstan 26 and stationary ramp guide 28 into vacuum loop bin 18 to form loop 19 and thence over roller 30 to take-up reel 10. The reels 10 and 12 are driven by reversible motors 32 and 34. Each of the motors 32 and 34 are controlled by separate motor control units shown in FIG. 1 as blocks 36 and 38 respectively. Upper reel motor control 36 is shown as being operated in response to position error signals on lines 41 and 42 from loop position sensing circuit 44. Similarly, lower reel motor control 38 is operated under control of position error signals on lines 47 and 48 from loop position sensing circuit 46. Dual output signals from reel motor controls 36 and 38 are applied over lines 112–113 and 114–115 respectively to energize clockwise or counterclockwise direction motor windings of motors 32 and 34 such as to position tape loops 19 and 22 in vacuum loop bins 18 and 20 at established reference level loop position indicated by reference line 104. Thus, when capstan 26 moves tape 14 between reels 10 and 12, the deviation of the positions of tape loops 19 and 22 with respect to reference line 104 result in position error signals for controlling reel motors 32 and 34 for rotation in the proper direction and speed to reposition tape loops 19 and 22 at reference line 104.

Transducer 25 may be of the type known in the art capable of reading or writing a plurality of tracks on the tape. An electronic system is included in peripheral controller 58 for driving the head to write bits of digital information received over line 23 from peripheral controller 58 transversely across the tape, each on a different one of the tracks, and also for reading and playing back the recorded information. This electronic system may be of the type known in the art, and therefore is not described herein.

The capstan 26 in this embodiment is the primary means for moving tape across transducer 25 during writing, reading and rewinding digital data on the tape. Capstan 26 is rotated by a reversible motor 50 which is mechanically coupled to capstan 26. Capstan motor 50 is controlled by capstan motor control block 52 which is shown in block diagram form in view of the fact that those skilled in the art are cognizant of numerous control circuits which may be utilized for controlling the direction of rotation and the torque of such motors.

Capstan motor 50 responds to control signals from optical tachometer 51 by means of line 54, and control signals on lines 55 through 57, from peripheral controller 58. The capstan motor velocity is detected by a tachometer which includes rotating disc 53 mounted on the shaft of motor 50 to allow passage of light through holes in the disc from light source 71 to detector 73 as the disc revolves for generation of pulses corresponding to the velocity of motor 50 for applying to capstan motor control 52 by means of line 54. Peripheral controller 58 provides forward, reverse, and rewind control signals on lines 55 through 57 respectively to capstan motor control 52. These signals, in the form of single pulses, from lines 55 through 57 are indicative of commands for the capstan to move tape in a forward or reverse direction respectively. The forward direction is from supply reel 12 to take-up reel 10. The reverse direction is from take-up reel to supply reel 12.

Peripheral controller 58 receives controller commands from an information processor 80 over control line bus 81 and responds thereto for controlling the transfer of information in either direction between the information processor 80 and peripheral controller 58 over data flow bus 82.

Facilities for forming and receiving tape loops are provided in the form of bins 18 and 20. These bins include a back wall 64, side walls provided by side members 60 and 62 respectively as shown in FIG. 2, second side walls on opposite sides of a central divider 66 and a front wall 68. Side members 60 and 62 are spaced equal distances on each side of central divider 66 to provide desired bin width and are mounted in airtight relationship on a translucent light diffusing back wall panel 64. The channels formed between side spacers 60 and 62 and central divider 66 are covered by a tinted transparent front wall panel 68 which is spaced by the thickness of side members 60 and 62 and central divider 66 from back wall 64. Front wall panel 68 and back wall 64 are spaced apart by a sufficient distance to provide a depth of the bin between the front wall 68 and back wall 64 which is slightly greater than the width of tape 14 for entry and exit clearance of the tape at the top end of the bin. Ports 70 and 72, shown in FIG. 1, near the closed bottom end of the bins may be connected to vacuum blower 74 by means of tubes 75 and 76 for evacuating the bins. The tape is drawn by vacuum from the reels into the bins to form tape loops 19 and 22 in bins 18 and 20 respectively thus pulling the tape taut within vacuum loop bins 18 and 20, against capstan 26 and maintaining tape tension at a proper amount. Photoelectric position detectors 84 and 86 are similar with each consisting of 10 photoresistors 85*a*–85*j* and 87*a*–87*j* connected in parallel respectively, which are inserted in the side walls of side members 60 and 62 for detecting deviations in the position of loops 19 and 22 in vacuum bins 18 and 20 respectively. The photoresistors may be of the type known in the art as photoconductors such as photoconduction cells CL 705 HL offered by Clairex Corporation, New York, N.Y.

Bins 18 and 20 are uniformly illuminated continuously along their length by a single light source 88 which may be a fluorescent bulb receiving power from ripple free power source 92 over lines 93 and 94. Back wall 64 which consists of a translucent light diffusing material scatters light from light source 88 to provide uniform light throughout the interior of bins 18 and 20. Front wall 68, shown in FIG. 2, is a pane of transparent tinted material which reduces the effects of ambient light on photoelectric position detectors 84 and 86.

Position signal summing circuits 96 and 98 respond to the signals on lines 78–79 and 90–91 from position detectors 84 and 86 to produce a continuously variable smooth output signal on lines 100 and 102. The signals on lines 100 and 102 which are connected through impedance matching networks 174 and 173 and appear again on lines 175 and 171 respectively, are directly proportional to the sum of the corresponding parallel photoresistor effects and are representative of the actual tape loop positions in loop bins 18 and 20 respectively.

Vacuum loop bins 18 and 20 desirably contain loops of tape which are of sufficient length to accommodate the difference between the acceleration and decleration rates to the capstan 26 as compared with those of the reels 10 and 12. For optimum utilization of difference and balance type circuits to control reel motors and obtain maximum use of the capacity of the loop bins, the position of the tape loops is maintained at the center of the tape loop excursion limits about reference line 104 of FIG. 1. A signal representing the established reference level loop position at reference line 104 is therefore applied to a difference amplifier within each of loop position sensing circuits 44 and 46 for comparison with the actual loop position to determine the deviation of the loop position from the established reference level loop position and derive position error signals for control of reel motors 32 and 34 respectively.

Loop position sensing circuits 46 and 44 respond to the actual loop position signals received over lines 175 and 171 from impedance matching networks 174 and 173 respectively, to produce an error signal representative of the position error between the actual loop position and the established reference level loop position. Since intensity variations of light source 88 effects the magnitude of the signal representative of the actual tape loop position, a light source intensity photoresistor 106 which may be of the same type as used for photoresistors 85a–85j and 87a–87j is placed directly opposite light source 88 to produce a signal on lines 108 and 110 which is representative of the light source intensity variations. The signals on lines 108 and 110 are applied to the loop position sensing circuit which responds by modifying the desired position signal by a quantity which corresponds to the light intensity variation on the potential of the actual tape loop position signal. Thus, the position error signal is corrected to compensate for any inaccuracy which may be due to the light source 88.

A difference amplifier is employed within loop position sensing circuits 44 and 46 which responds to the signals representing the actual tape loop position on lines 171 and 175 respectively, the light intensity signal on lines 108 and 110 and an established reference level loop position to provide output position error signals on lines 41–42 and 47–48 for control of reel motor controls 36 and 38 respectively. The difference amplifier is capable of modifying the output position error signal by an amount corresponding to the rate of change of the actual loop position signal due to obtaining an approximate derivative of the continuously variable characteristic of the actual position signal, therefore the position error signal applied to reel motor controls 36 and 38 is electrically damped. Damping prevents the reel motors from accelerating or decelerating too rapidly and overshooting the established reference level loop position at reference line 104 in FIG. 1. An oscillator is also coupled into the difference amplifier to modulate the position error signals on lines 41–42 and 47–48 respectively.

Reel motor controls 36 and 38 respond to the position error signals on lines 41–42 and 47–48 to provide power to reel motors 32 and 34 for controlling the speed and direction of rotation of reel motors 32 and 34 so as to tend to maintain the position of loops 19 and 22 at reference line 104. Reel motor controls 36 and 38 each contain two separate power amplifiers which are biased at a desired threshold level for operation as high speed switches and connected to D-C split series motors 32 and 34 such that power is applied to the motor windings as variable width voltage pulses on lines 112–113 and 114–115 respectively. The pulses are obtained from the amplitude modulated error signals which control the power amplifier high frequency switches to provide power supply pulses from D-C power supply 124 over lines 123 and 125 for the portion of each cycle time when the amplitude of the error signal exceeds the threshold level.

The high frequency switches of reel motor controls 36 and 38 are placed in their on condition to connect power from power supply 124 to one of the motor windings and in their off condition to disconnect power from power supply 124 from the winding controlled by its corresponding switch.

Each of reel motor controls 36 and 38 control switching of power between a clockwise rotation winding and a counterclockwise rotation winding of motors 32 and 34 respectively. When the difference amplifier position error signal is applied, only one of the two separate high frequency switches in each of reel motor controls 36 and 38 responds to apply power pulses to either the clockwise rotation winding or the counterclockwise rotation winding of reel motors 32 and 34 respectively.

With tape loop positions as shown in FIG. 1, loop 22 is above reference line 104 and loop 19 is below reference line 104, therefore both reel motors 32 and 34 would be rotated clockwise to adjust the tape loop positions to reference line 104. The signals on lines 41–42 and 47–48 from loop position sensing circuits 44 and 46 are of the correct polarity and magnitude such as to operate the power amplifier switches of reel motor control 36 and 38 to provide voltage pulses only to the clockwise windings of motors 32 and 34. Since the D-C split series motors provide an inductive load, the time constants of the motor load are such that the motor responds to the average voltage of the pulses. Following restoring of the tape loops to their desired positions in the bins, the reel motor control circuits remain operating at a low output level, which is necessary to provide torque to counteract the torque caused by the vacuum in the bins pulling on the loops. The reel motor control circuits continue operating at a low output level until capstan 26 is rotated as a result of control signals from peripheral controller 58 to move the tape and provide a change in positions of loops 19 and 22 for producing the next position error signals from the loop position sensing circuits 44 and 46.

Photoresistors 116 and 118 located near the top of loop bins 18 and 20 respectively detect when the tape loop exceeds its normal upward excursion limit. Photoresistors 120 and 122 are located near the bottom of loop bins 18 and 20 to detect when the tape loop exceeds its normal downward excursion. Photoresistors 116 and 118 and 120 and 122 are referred to hereinafter as high/low tape sensors. High/low tape logic 126 responds to signals on lines 127–129 indicative of a high or low tape condition in either of bins 18 or 20 to apply brakes 130 and 132 to reel motors 32 and 34 respectively. A signal is also provided on line 134 to reel motor controls 36 and 38 to clamp the power amplifier switches to their off state thereby preventing connection of power from power supply 124 to the motor windings of motors 32 and 34 respectively. The high/low tape logic 126 also provides a signal over line 133 to peripheral controller 58 such that peripheral controller 58 will not attempt to control the capstan for further tape movement until the abnormal tape position conditions are corrected.

All successive tape loop position deviations from the desired established reference level loop position at reference line 104 are similarly sensed and processed accordingly to adjust the tape loop position in vacuum loop bins 18 and 20 respectively to reference line 104.

A more detailed discussion of the tape handler loop control system will be understood by making reference to the FIGS. 2–12. The following components and circuits find general employment in the tape handler reel control system of FIGS. 1, 9 and 10; photoresistors, difference amplifiers, lead circuits and split series motors. Standard electrical symbols are employed throughout the schematic diagrams to represent these components and circuits.

The photoresistor is a two terminal device which has the characteristic of providing a resistance across its terminals when illuminated which varies according to the light intensity and having a high resistance when not illuminated.

The difference amplifier may be, by way of example, a symmetrical circuit including a pair of transistors having a common emitter-resistor. Accordingly, signals applied to the base of one of the transistors will be translated into a pair of corresponding signals respectively of opposite polarity at the collectors of these transistors. The voltages between the collectors and ground may constitute the outputs of the difference amplifier.

The lead circuit is, by way of example, a parallel network formed by a capacitor connected in parallel with a resistor such that the voltage leads the current when a voltage is applied across the circuit. Lead circuits are aften employed in conjunction with other circuit components of servo control systems to obtain the approximate derivative of a variable signal which is used for modifying an error signal to obtain damping effects.

The D-C split-series motor is a motor which has two separate field windings with each of the windings in series with the armature winding. Characteristics of a series motor are that it exhibits high torque when overloaded and operating at 100% duty cycle. The series motor also exhibits an increase in speed as the applied power increases unless it is heavily loaded.

Referring now particularly to FIGS. 2 and 3, there is shown the details of construction of vacuum loop bins 18 and 20. The bins 18 and 20 include a flat back wall 64 which is of a translucent light diffusing material. Along each longitudinal edge of wall member 64 are attached side wall members 60 and 62 of suitable material. The side wall members 60 and 62 and central divider 66 which separates bins 18 and 20 and provides a second side wall of each bin, may be attached to the back wall by any suitable connecting means.

The front wall 68 of bins 18 and 20 comprises an access door formed by a panel of tinted transparent material. Front wall 68 is connected to side spacer 60 by means of hinges such as hinge 136 and to side spacer 62 by spring latch 138 as shown in FIG. 2. The hinged front wall 68 provides a front wall, provides an access door to the tape bins, permits operator observation of the action of the tape loops, and reduces the effects of ambient light within bins 18 and 20, when in the closed position. The front wall 68 is separated from back wall 64 by the side members 60 and 62 and central divider 66 by a distance which is slightly greater than the width of the tape to form two adjacent four sided bins wherein the tape loops may move. Affixed to the inside surfaces of side wall members 60 and 62 by means of a suitable cement or any other fastening means is a strip of material having the same width as side wall members 60 and 62. The material on the side walls prevents static electricity from being generated on the surface of the tape.

The lower end of each bin is closed and suction outlet tubes 75 and 76 with corresponding port holes 70 and 72 are provided for vacuum loop bins 18 and 20 respectively. The upper end of each bin is open and provides an entrance area of tape loops 19 and 22. As tape enters each bin, a positive atmospheric pressure differential with respect to the evacuated bin pushes the tape downward into the bin to form substantially a perfect semicircular loop of tape.

Back wall 64, which is of a translucent light diffusing material forms a part of the sensing system for bins 18 and 20. Externally to the bin behind central divider 66 is located a longitudinal fluorescent lamp of light source 88 which extends beyond the upper and lower limits of normal tape loop position excursion. Power to the fluorescent lamp light source 88 is provided by means of lines 93 and 94 from a ripple free power source 92. The fluorescent lamp of light source 88 is spaced from bins 18 and 20 such that the fluorescent lamp of light source 88 provides equal amounts of continuous light throughout the length of both bins. The panel of diffusing translucent material such as frosted glass or other suitable transparent material providing back wall 64 is positioned adjacent light source 88 to scatter or diffuse light uniformly throughout the length of vacuum loop bins 18 and 20. Thus, light intensity within bins 18 and 20 is substantially uniform for providing continuous light throughout the length of vacuum loop bins 18 and 20 for exposure to photoresistors **85*a*–85*j*, 116, 120 and 87*a*–87*j*, 118, 122 which are mounted in side walls 60 and 62** respectively.

Light intensity variations of the fluorescent lamp of light source 88 are sensed by photoresistor 106 which is mounted in the back side of central divider 66 directly opposite light source 88. Since the intensity of the fluorescent lamp of light source 88 may vary in accordance with power source fluctuations and age of the lamp, any resulting change in detection will be sensed by a change in resistance of photoresistor 106.

The position of tape loops 19 and 22 in adjacent bins 18 and 20 are sensed by 12 photoresistors, in co-action with the uniform continuous light source 88. Along the longitudinal bin side of side members 60 and 62 are tape loop position detectors 84 and 86 comprised of 10 equally spaced photoresistors **85*a*–85*j* respectively which are mounted in side spacers 60 and 62 which are recessed sufficiently such as to not interfere with the tape loop as it moves upward and downward inside the bins. As the tape loop moves past each photoresistor, the tape along the side of the bin, the tape loop, exposes or blocks light to the photoresistors. The illumination and consequent energization of the photoresistors thus varies in accordance with the tape loop position. Photoresistors 118, 122 and 116, 120 which are mounted, in a manner similar to the position detectors 84 and 86, near the top and bottom of tape loop bins 18 and 20 respectively detect abnormal high/low tape loop positions. The illumination and energization of photoresistors 118, 122 and 116, 120 also varies as the position of the tape loop changes. The physical arrangement as shown in FIG. 2 is such that high and low photoresistors in vacuum loop bins 18 and 20 receive illumination from the same light source 88 which provides uniform continuous illumination throughout both vacuum loop bins 18 and 20** to the tape loop position photoresistors and the light source intensity photoresistor. It is therefore shown that a single light source provides illumination for the tape loop position sensors, high and low tape sensors, and a light source intensity sensor for detecting indicated changes in the light source.

Each of photoresistors 106; **85*a*–85*j*; 87*a*–87*j*; 118, 122; and 116, 120** may be of the type previously identified which respond to illumination from a light source to provide a variable resistance which varies logarithmically with the illumination area visible or the intensity of the light source.

With reference to FIG. 4, the variation in the illumination area as seen by two adjacent photoresistors when a tape loop is moving downward in a tape loop bin is shown. For illustrative purposes, bin 18 is shown, its associated loop 19 and adjacent photoresistors **85*a* and 85*b* of position detector 84**. FIGS. 4*a*–4*d* show that as tape loop 19 descends in tape bin 18, the light within illumination area 140 is intercepted by tape loop 19 to vary the visible area of illumination to photoresistor **85*a***.

The geometrical relationship of tape loop 19 and the illumination area of a typical photoresistor **85*a*** has been shown in FIG. 5. Based upon the principle that the tape loop forms a semicircle due to having a specific amount of vacuum pressure, differential present within the vacuum loop bin, the following formulas have been derived:

$$X=\frac{1}{2}\left\{\frac{\sin\theta-\cos\theta+1}{\cos\theta}\right\}$$

$$A=\frac{W^2}{4}\left\{\frac{3\sin\left(\frac{\beta}{2}+1\right)}{\cos\frac{\beta}{2}}+\frac{\sin\theta-1}{\cos\theta}+\frac{\theta-\frac{\beta}{2}}{2}\right\}$$

$X$=displacement of the tape loop tip on either side of the center line of the photoresistor $\theta$=angle between a line passing through the center of the photoresistor perpendicular to the sides of the bin and a second line passing through the center of the photoresistor and through a tangent point to the tape loop.

$\beta$=beamwidth angle of the photoresistor $W$=bin width $A$=area of illumination visible to the photoresistor.

Curves 142 and 144 of FIG. 6 have been plotted for values obtained through calculations using the above formulas to obtain the plotted values which represent variations in the visible illumination area as the tape loop position varies by a displacement X on either side of the photoresistor center. From curves 142 and 143 of FIG. 6 it is seen that the visible area increases as tape loop 19 moves upward exposing the entire illumination area to the photoresistors. By spacing the photoresistors sufficiently close together such that their visible areas of illumination overlap as shown in FIGS. 4*a*–4*d*, it is shown by curve 144 representing the algebraic sum of curves 142 and 143 that a continuously variable area of illumination is obtained. Since the response of each photoresistor is such that the resistance varies logarithmically with the illumination area, it is seen that an electrical signal is obtained which is continuously variable provided that the photoresistors are properly spaced and the individual photoresistor responses are summed together to provide a signal which is proportional to the number of photoresistors.

Utilizing the photoresistors previously identified and as an example with bin dimensions of 2 inch width and ½ inch depth it is found that a continuously variable electrical signal similar to that shown in FIG. 8, representing a changing loop position, is obtained by providing a spacing of one inch between each photoresistor. Since bin dimensions and photoresistor characteristics for visible beamwidth and response vary, the required spacing is different for each change of the variables.

While various types of circuits may be used to sense the changes in resistance of the parallel networks of photoresistors mounted in the walls of tape bins 18 and 20, a preferred circuit is shown in FIG. 7. The circuit of FIG. 7 is shown in block form as position summing circuits 96 and 98 in FIG. 1. The summing circuit of FIG. 7 provides a continuously variable smooth output signal at terminal 102 which is represented by curve 146 of FIG. 8 which indicates the voltage potential at terminal 102 as the tape loop position changes from its normal maximum top excursion to its normal maximum bottom excursion in the bin. The provision of a substantially continuous variable smooth signal from the summing circuit of FIG. 7 results from the combination of having proper physical spacing of the photoresistors such that the visible areas of adjacent photoresistors overlap, a uniform light source throughout the vacuum loop bin and the ability of the summing circuit to sum together the parallel resistance of photoresistors 85*a*–85*j* and 87*a*–87*j*.

Photoresistors 85*a* through 85*j* as shown in FIG. 7 are effective by virtue of the parallel connections between these photoresistors to establish in combination with transistor 150, having terminals 151, 91 and 102, a voltage divider circuit. The voltage divider is such that potential voltages of the output voltage at transistor collector terminal 102 increases when the resistance of position detector 84 decreases. Thus the potential at terminal 102 is directly proportional to the amount of illumination on the photoresistors. The base terminal 151 of transistor 150 is connected to potentiometer 155 to establish a biasing potential of 0 volts at terminal 151 of transistor 150 by means of the voltage divider combination provided by the resistors 157, 155, and 156 between −12 volt potential at terminal 158 and +6 volts at terminal 159. The voltage divider provided through transistor 150 produces a potential at terminal 102 having a magnitude which is a direct function of the length of tape loop 19 in tape bin 18 for the effective resistance established by the parallel connection of photoresistor 85*a* through 85*j* as the tape loop 19 increases in length.

There is similarly established an output potential from summing circuit 96 associated with loop position sensing circuit 46. Position summing circuit 96 similarly produces a potential on line 100 which is a direct function of the position of the tape loop 22 in bin 20 in response to the position of tape loop 22 with respect to photoresistors 87*a* and 87*j*.

The speeds and directions of rotation of motors 32 and 34 vary automatically according to the tape loop positions of their corresponding tape loops. The loop position is sensed by the parallel combinations of photoresistors 85*a*–85*j* and 87*a*–87*j* for loops in bins 18 and 20 respectively in co-action with light source 88. Light from light source 88 is uniformly scattered throughout bins 18 and 20 and those photoresistors below the tape loop are exposed to illumination. The illumination and consequent resistance of the photoresistors thus varies as the height of the loop. Energization of the photoresistors controls the summed parallel resistance of the position detectors 84 and 86 such that as the loop position rises in the vacuum loop bin, the number of illuminated photoresistors increases thus reducing the parallel resistance and increasing the output at terminal 102. It is clear that the potential of the collector terminal 102 of transistor 150 increases as the tape loop position rises and decreases as the tape loop falls in accordance with curve 146 of FIG. 8.

Referring to FIG. 8, it is shown that with the tape loop at the top, middle, and bottom positions of the normal tape loop excursion, potentials of −4, −8 and −12 volts respectively are provided at terminal 102 of position summing circuit 98. The potentials of −4, −8, and −12 result from having minimum, average, and maximum parallel photoresistance at the respective loop positions resulting in minimum, average and maximum voltage drops across the parallel network. The value of resistor 154 is selected to have a resistance such that when the tape loop position is at reference line 104 with five photoresistors exposed to illumination, a potential of −8 volts is present at terminal 102. Thus, it is seen in FIG. 8 that the output potential at terminal 102 may vary from −4 volts to −12 volts when the tape loop assumes different loop positions in bins 18 and 20. The nine points of minimum voltage change, which are evident in the curve of FIG. 8, correspond to the points midway between the spaced photoresistors. Referring to FIGS. 1 and 2, photoresistors 116, 118 and 120, 122 provide variable resistance input signals over lines 127, 128 and 128, 129 respectively to high/low tape logic 126 as previously dsecribed. The conditions of high or low limit signals are determined by the logic of block 126, which may be any combination of known alarm detection logic circuits. During normal operation, the lower photoresistors 120, 122 must receive light and the top photoresistors 116, 118 must not have light. Abnormal operating conditions which may be indicated, occur when the fluorescent lamp of light source 88 is extinguished due to age or other power disturbances and when the capstan is rotated at speeds which exceed the operational control limits of the reel drive motors. Other conditions which may result in high/low tape conditions for alarm are when tape breakage occurs or due to malfunctions of the tape reel motor control system. High/low tape logic 126, when activated by either illuminating one of the top photoresistors 116 or 118 or cutting off light to one of the lower photoresistors 120 or 122 responds by providing output signals on lines 160 and 161 to operate brakes 130 and 132 respectively and on line 134 to reel motor controls 36 and 38 to clamp the power control circuit switches in their off state to prevent connection of the power supply 124 voltage pulses to the windings of motors 32 and 34. High/low tape logic 126 also provides a signal to peripheral controller 58 over line 133 indicating that a high or low tape condition has occurred. Peripheral controller 58 responds to the signal on line 133 by preventing further rotation of capstan 26.

The output voltage from position summing circuit 98 of FIG. 7 may be used in a servo system for controlling the speed and direction of reel servo motors 10 and 12 to maintain the position of loops 19 and 22 at reference level 104 of vacuum loop bins 18 and 20 respectively.

The system provided for controlling the operation of the reels in the tape transport illustrated in FIG. 1 is shown, in general, partially in block and partially in schematic diagram form in FIG. 9. In FIG. 9 the upper reel 10, its associated left bin loop position detector 84, light source intensity sensor 106, loop position sensing circuit 44 and reel motor control circuit 36 are shown. The lower reel 12 and its associated apparatus are not shown in order to simplify the illustration. The upper reel 10 is driven by a split series D.C. motor. A loop position sensing circuit 44 is associated with its vacuum loop bin position detector 84, reel motor control circuit 36 and motor 32 for driving the motor in the proper direction and speed to maintain the loop 19, which isolates capstan 26 from reel 10, at a predetermined position along reference level 104 in FIG. 1. A similar motor and reel motor control system is associated with lower reel 12.

The reel motor control system for upper reel 10 includes a loop position sensing system comprised of loop position detector 84 with position summing circuit 98, a difference amplifier 164, a reference circuit 170, reference oscillator 198 and motor control circuit 36. The difference amplifier 164 may be an amplifier of the type to be described in greater detail in connection with FIG. 10. Difference amplifier 164 combines the signals from the loop position detector 84 and the light source intensity sensor 106, modifies the output signal for rate control, and modulates the resulting output position error signal. The output position error signal is modulated by means of coupling reference oscillator 198 into the circuit to produce modulated position error output signals for applying to motor control circuit 36. The motor control circuit 36 may be of the type described hereinafter in connection with FIG. 10 for controlling the direction and speed of rotation of motor 32 so as to maintain the position of tape loop 19 at predetermined reference level 104. Lead circuits 166 and 168 are included in difference amplifier 164. The lead circuits respond to the rate of change of the actual position signal from position summing circuit 98.

The reel motor control system of FIG. 9 receives left bin loop position detector 84 inputs on lines 90 and 91 which are applied to loop position summing circuit 98 to derive a loop position signal for applying over line 102 to impedance matching circuit 173 and over line 171 to difference amplifier 164. Light intensity sensor 106 produces a variable resistance light intensity signal which is applied to reference circuit 170 on lines 108 and 110. Reference circuit 170 is a circuit similar to position summing circuit 98 which modifies the signal representing the desired established reference loop position in accordance with the light intensity signal on line 110 from light intensity sensor 106 to produce a modified established reference level loop position signal for applying on line 172 to difference amplifier 164. Output position error signals from difference amplifier 164 are obtained by connecting lines 41 and 42 to the collectors of transistors 176 and 178 respectively. The output potentials from difference amplifier 164 appearing at terminals 180 and 182 represent the position error signals which represent the amount of deviation between the actual loop position signal and the signal representing an established reference level loop position modified by the light source intensity signal.

The difference amplifier of FIG. 9 is a symmetrical circuit including a pair of transistors 176 and 178 having from each emitter 186 and 188 lead circuits 166 and 168 respectively of equal resistance value connected to a constant current source 184. Accordingly, signals applied to the base of one of the transistors will be translated into a pair of corresponding output signals on each transistor collector 190 and 192 which is connected through equal resistors 194 and 196 to a voltage potential source of +12 volts modulated ±1.5 volts by reference oscillator 198 coupled through transformer 200 to the +12 volt supply line. It is clearly seen that with equal potentials applied to base 171 and 172 of each of transistors 176 and 178, the output potentials at terminals 180 and 182 will be of equal value. This would be the case where the actual loop position signal on base 171 and the established reference level loop position signal on base 172 are equal indicating that the tape loop position is at reference level 104 of FIG. 1.

Error signals at terminals 180 and 182 are applied over lines 41 and 42 to counterclockwise motor control 204 and clockwise motor control 202 respectively. The voltage between the collectors of the difference amplifier transistors 190 and 192 and ground may constitute the position error signal outputs of the difference amplifier. These outputs are applied to reel motor control circuit 36 which is shown in FIG. 9 as including clockwise motor control 202 and counterclockwise motor control 204. Motor controls 202 and 204 are power amplifiers which operate as switches for applying voltage pulses from power supply 124 to windings 208 and 206 respectively for controlling the direction and speed of rotation of the motor 32 which drives top reel 10 of FIG. 1. The reel motor control circuit will be described in detail hereinafter.

The left bin high and low tape photoresistor sensors outputs 116 and 120 appear on lines 127 and 129 respectively for applying to high/low tape control 126. High/low tape control 126 detects abnormal conditions of high or low tape loop excursions beyond the limits of normal tape loop excursion to provide an output signal on lines 160 and 134 to brake 130 of reel motor control 36 for halting reel rotation during abnormal operation conditions, and to the peripheral controller 58 indicating that an abnormal operating condition exists which has halted reel motor control.

Referring to FIG. 10, detailed operation of difference amplifier 164 and associated circuits will be described. Input to the base of transistor 176 is from the tape loop position summing circuit 98 of FIG. 7 which has been described previously. Transistor 150 of summing circuit 98 has its base 151 biased to ground potential by means by adjusting potentiometer 155 which is the initial system balance potentiometer. The circuit provided by resistor 154 and capacitor 210 in parallel provide an integrating circuit for the collector of transistor 150 which removes noise from the output of position summing circuit 98 at terminal 102. The potential at terminal 102 varies in accordance with curve 146 of FIG. 8 and is applied to the base of transistor 212 which is an emitter follower for lowering impedance to match the circuit impedance of transistor 176. The potential appearing on the emitter of transistor 212 is applied to the base of transistor 176 and represents a potential which varies in accordance with curve 146 of FIG. 8. Thus, the loop position signal is applied to the base of transistor 176 as one input to difference amplifier 164.

Emitter 218 of transistor 176 is connected through lead circuit 166 comprised of resistor 214 and capacitor 216 in parallel which in conjunction with resistor 194 provides rate of change control. The combination of resistor 214, capacitor 216 and resistor 194 respond to changes in the loop position signal on base 171 of transistor 176 to produce an approximate derivative of the continuously variable smooth loop position signal for modifying the output position error signal in accordance with the rate of change of the loop position signal. The output signal is therefore electronically damped for motor speed control. Emitter 218 is connected through lead circuit 166 to constant current source 184 consisting of transistor 220, resistor 221, potentiometer 222, voltage potentials of −12 and −24 volts, Zener diode 223 and resistor 224. Potentiometer 222 is the adjustment potentiometer for obtaining the desired output potentials from the balanced condition of difference amplifier 164. The collector of transistor 176 is connected to output terminal 180 on line 41 and through resistor 194 to +12 volts which is transformer coupled to reference oscillator 198. The collector of transistor 176 is connected by means of line 41 to counterclockwise motor control 204 of reel motor control 36.

The input to the opposite side of difference amplifier 164 is derived from reference circuit 170 which consists of transistor 178, lead circuit 168 comprised of resistor 225 and capacitor 226. The potential connected to base 172 of transistor 178 corresponds to the potential adjusted by potentiometer 155 to obtain the base potential for transistor 150 of position summing circuit 98. The light intensity signal on line 110 from light intensity photoresistor 106 is connected to the emitter of transistor 230. The collector of transistor 230 is connected through integrating circuit 232 comprised of resistor 234 and capacitor 236 connected in parallel to a potential −12 volts. The collector of transistor 230 is also connected to the base of transistor 240 which is an emitter follower for lowering the impedance to the base of transistor 178. The potential appearing on the emitter of transistor 240 therefore corresponds to the established reference lead loop position signal modified in accordance with the light intensity signal. The potential at the emitter of transistor 240 and base 172 of transistor 178 therefore corresponds to the light source intensity compensated established reference line loop position signal. The emitter of transistor 178 is connected through lead circuit 168, comprised of resistor 225 and capacitor 226 connected in parallel, to constant current source 184. The collector of transistor 178 is connected through resistor 196 (which is of equal value to resistor 194 connected to the collector of transistor 176) to +12 volt potential which is transformer coupled to reference oscillator 198. The collector of transistor 178 is also connected by means of line 42 to clockwise motor control 202 of reel motor control 36. The potential at terminal 182 on line 42 therefore represents the second output of difference amplifier 164.

Difference amplifier 164 therefore has one input representing the actual loop position of tape loop 19 in tape bin 18 at the base of transistor 176 and the potential representing the light intensity compensated established reference level loop position at the base of transistor 178. With reference to FIG. 11, the potential at terminal 180 varies in magnitude from +4.5 volts ±1.5 volts when tape loop 19 position is at the bottom point of the bin to −1.5 volts ±1.5 volts when tape loop 19 position is at the top of the bin. With the base of transistor 176 at a potential of −8 volts corresponding to the output of position summing circuit 98 when the tape loop 19 is at desired loop position reference level 104, the potential at the base of transistor 178 is likewise at −8 volts providing a balanced input to both transistors.

The circuit components are selected such that the potential at both terminals 180 and 182 is +1.5±1.5 volts with the tape loop 19 position at the established reference level loop position corresponding to reference line 104. Since lead circuits 166 and 168 are both connected to constant current source 184 and current flowing in each half of the balanced difference amplifier is equal, the potential at the emitters of transistors 176 and 178 follows the potential of the base of transistors 176 and 178.

For simplicity, difference amplifier response will be described first for loop position input signals which are not changing with time followed by the more complex case for the continuously variable loop position signal.

Referring to FIG. 8, it is seen that the potential at the base of transistor 176 varies according to the position of the tape loop in its corresponding bin. The potential at the base of transistor 176 therefore is at −12 volts when the tape is at the bottom of the bin, −8 volts when it is at the middle or desired position and −4 volts when the loop is at the top of the bin. Difference amplifier 164 responds to a position signal of −4 volts corresponding to the tape loop position being at the top of the bin such that current flowing through lead circuit 166 increases from the value of the current when the position signal was −8 volts. Since current is provided by a constant current source, the current is divided between each half of the difference amplifier, therefore a corresponding decrease in current appears through the side of the difference amplifier containing transistor 178. Increasing the current through the circuit of transistor 176 causes the output at terminal 180 to decrease to provide a negative potential at terminal 180 for application to counterclockwise direction motor control 204 for rotating the motor in a counterclockwise direction allowing the tape loop to lower toward the desired loop position reference level 104. With a corresponding decrease in current flowing through the circuit of transistor 178, the output potential at terminal 182 becomes more positive such that when it is applied to clockwise motor control 202, no output to motor 32 is present to provide clockwise motor rotation.

When the tape is at its bottom position, a potential of −12 volts appears at the base of transistor 176 resulting in a decrease in current, from the amount of current when the position signal was −8 volts, through lead circuit 166 to provide a corresponding increase in current through lead circuit 168 and through transistor 178. The decrease in current through the circuit containing transistor 176 results in an increase of potential at terminal 180 to +4.5±1.5 volts as shown in FIG. 11. When a positive potential appears at terminal 180 which is greater than +1.5±1.5 volts counterclockwise motor control 204 does not provide output voltage to motor winding 206 for counterclockwise rotation. Since the current through transistor 178 increased a corresponding amount to the decrease of current through transistor 176, the potential at point B decreases providing a −1.5±1.5 volts to clockwise direction motor control 202 such that voltage is applied to motor winding 208 to rotate motor 32 in a clockwise direction to take-up slack tape in bin 18 such that the tape loop position moves toward its desired reference level 104 position.

Rate control is provided by lead circuits 166 and 168 in conjunction with resistors 194 and 196 in difference amplifier 164. The parallel network of capacitors 214 and 216 connected to the emitter of transistor 176 and resistor 194 connected to the collector of transistor 176 form a differentiating network to obtain an approximate derivative of the loop position signal at the base of transistor 176 to provide output rate control. For examples of such prior art design of proportional error servomechanisms with first derivative output control, reference is made to: G. J. Thaler and R. G. Brown, "Servomechanism Anlysis" (McGraw-Hill Book Company, Inc., 1953), Chapter 4, pp. 72–107 and Chapter 12, p. 258 and G. J. Thaler and R. G. Brown, "Analysis and Design of Feedback Control Systems" (McGraw-Hill Book Company, Inc., 1960, 2nd Edition) Chapter 4, pp. 79–114 and Chapter 7, p. 231. Since the potential at the emitters of transistors 176 and 178 follows the potential at the base of transistors 176 and 178, lead circuits 166 and 168 will sense any rapid change in the potential of the base of transistors 176 and 178 respectively.

Rate control response of difference amplifier 164 is described only for the control obtained for the position error signal at terminal 180 due to the response of circuit components connected to transistor 176. Rate control is accomplished similarly for the position error signal at terminal 182 due to the response of circuit components connected to transistor 176. Assume that the actual loop position signal at base 171 of transistor 176 is changing rapidly from −8 volts to −4 volts. For the −4 volts signal as was previously described, a change in potential at terminal 180 from +1.5±1.5 volts to −1.5±1.5 volts occurred. Since the parallel network of capacitor 216 and resistor 214 have a particular time constant the emitter potential is prevented from rising as rapidly as it would otherwise and since the emitter potential change follows the base potential change, the base to emitter potential difference remains essentially the same. However, the base to collector difference has rapidly become greater with the more positive base increasing the base to collector current across resistor 194 greatly to cause the potential at terminal 180 to decrease more rapidly than would otherwise be possible solely due to the increased emitter-collector circuit current previously described. This provides control for decreasing the position error signal rapidly when it is necessary to accelerate the reel motor in response to a rapidly changing loop position. Assume that the actual loop position signal at the base of transisfor 176 is changing rapidly from −4 volts to −8 volts. Since capacitor 216 has a positive potential charged up, when the emitter becomes more negative capacitor 216 discharges through resistor 214 preventing the potential at the emitter from decreasing as rapidly as would otherwise be possible. Since the potential at terminal 180 is negative due to the previous −4 volts at the base of transistor, the base to collector potential difference exists for a period of time to provide base to collector current across resistor 194 tending to prevent the potential at terminal 180 from becoming positive as rapidly as would otherwise be possible solely to the decrease in emitter to collector current. Thus control is provided to prevent the position error signal at terminal 180 from becoming positive too rapidly which results in electronic damping when the input signal is changing rapidly. Since for difference amplifiers any change occurring in either half of the circuit causes a similar change in the other half, the rate of change response by lead circuit 166 and resistor 194 results in a corresponding response by lead circuit 168 and resistor 196 to provide damping for the difference signals at terminal 182. Damping control is required in magnetic tape handlers to prevent the reel motors from moving the tape at too fast a rate such that its associated tape loop overshoots its desired loop position reference position in the bin.

Reference circuit 170, which receives a signal on line 110 from intensity photoresistor 106, provides a signal to the base of transistor 178 such that any change in the light intensity of light source 88 will appear on the case of transistor 178 to modify the −8 volts potential established to correspond with the tape loop position at its desired loop position reference level position. Since any change in light intensity results in a similar change of photoresistor response in detection of the actual loop position, a change in potential at the base of transistor 176 appears which corresponds to any change at the base of transistor 178. Light intensity photoresistor 106 is of identical type as that employed for sensing the actual loop position, therefore resistors 154 of the position summing circuit 98 and resistor 234 of reference circuit 170 have been selected of specific magnitude such that the parallel ratio of the resistance of five photoresistors of bin loop position detector 84, when the tape loop is at reference level 104, to resistor 154 is in the same ratio as the single photoresistor 106 to resistor 234. Since in the parallel photoresistor network of position detector 84, five resistors are illuminated with the tape loop at reference level 104 position, the parallel resistance of loop position detector 84, is equal to one-fiifth the resistance of the single photoresistor 106. Therefore to maintain proper resistance ratios for the voltage dividing networks of transistors 150 and 230, resistor 234 is selected to be five times the magnitude of resistor 154. Similarly, by changing the resistance values, light intensity variation compensation can be provided when using any desired photoresistors.

A change in light intensity resulting in variation of potential at the base of transistor 178 results in a similar change in potential at the base of transistor 176 to provide compensation for any change in light intensity of light source 88.

Since a difference amplifier only amplifies the signal representing the difference between the potentials at the bases of transistors 178 and 176 and since each signal at the bases of transistors 178 and 176 varies by the same amount when the intensity of light source 88 changes, the difference signal remains the same, therefore no change in output at terminals 180 and 182 is experienced. Thus it is seen that the tape loop position remains unchanged as the intensity of light source 88 changes.

With reference to FIG. 10, potentiometer 155 at the base of transistor 150 is adjusted with the tape loop position at desired loop position reference line 104 such that potentials at terminals 180 and 182 from difference amplifier 164 are of equal magnitude. Potentiometer 222 of current source 184 is adjusted such that the potentials at terminals 180 and 182 are at +1.5±1.5 volts with the tape loop at desired loop position reference level 104.

Clockwise and counterclockwise motor controls 204 and 202 each contain power amplifiers which are biased to switch power in the form of pulses from power supply 124, to corresponding motor windings 206 and 208 respectively only when the potential at terminals 180 and 182 is negative. In order to control the speed of motor 32 it is desired to provide voltage of different magnitude to allow accelerating the motor at desired rates. This is accomplished by modulating the potentials appearing at terminals 180 and 182 by ±1.5 volts such that when the modulated potential varies a portion of the cycle is negative and a portion of the cycle is positive. Accordingly, both clockwise and counterclockwise motor controls 204 and 202 operate as switches which connect 60 volt D-C power supply 124 to motor windings 206 and 208 respectively in the form of voltage pulses varying in width according to the negative portion of each cycle of the signals on lines 41 and 42. For clockwise rotation, voltage pulses are applied to winding 208 and for counterclockwise rotation power pulses are applied to winding 206. Since the motor winding inductance and resistance provide an inductive load with a sufficiently long time constant, and since the motor derives torque from current the motor responds to the average voltage of the voltage pulses switched through motor control circuit 36.

The particular motor control circuit to be described hereinafter in connection with FIGS. 10 and 12 varies the width of voltage pulses applied to the motor windings according to the portion of the modulated control signal cycle which is negative. The percentage of the time of each cycle during which power is applied is hereinafter referred to as the percentage of the duty cycle. Voltage pulses applied to the motor windings are varied in width by motor control circuit 36 such that the full power supply voltage can be applied for the entire cycle when the entire control signal cycle is negative to obtain a 100% duty cycle. Since the width of power pulses is varied through a range in which the entire cycle may be either negative or positive, power can be applied to the motor during none or all of the cycle.

Referring to FIG. 11, when the tape is at the bottom of the bin, terminal 180 has a potential of +4.5±1.5 volts varying between +6 volts and +3 volts. Since counterclockwise motor control circuit 204 is biased such that it provides no output voltage to motor 32 when its input is positive, no output is provided to winding 206 for counterclockwise rotation. For the case where the tape loop position is at reference level 104 position, a potential of +1.5±1.5 volts appears at terminal 180. The potential at terminal 180 varies between +3 volts and 0 volts due to being modulated by ±1.5 volts. Since no negative portion of the cycle is present at the input to counterclockwise motor control 204, no output voltage is applied to motor winding 206. For the case where the tape loop position is at the top of the bin, the potential at terminal 180 is −1.5±1.5 volts varying between 0 volts and −3 volts. Therefore, the entire signal cycle of the potential at terminal 180 is negative and counterclockwise direction motor control 204 applies voltage for the entire cycle to motor winding 206 for counterclockwise rotation of motor 32. Similarly, the potentials at terminal 182 vary oppositely to the potentials at terminal 180 to control clockwise motor control 202 to provide voltage to motor winding 208 for clockwise rotation of motor 32.

With reference to FIG. 11, it is seen that with the tape loop at the top of the bin the signal at terminal 180 is $-1.5\pm1.5$ volts to provide voltage to winding 206 for counterclockwise rotation of motor 32 and that with the tape loop at the bottom of the bin the signal at terminal 182 is $-1.5\pm1.5$ volts to provide voltage to winding 208 for clockwise rotation of motor 32.

Motor 32 as shown in FIG. 10 is a direct current motor of the split series type having field windings 206 and 208 and armature winding 242. Motor 32 rotates in a clockwise sense so as to feed the tape in a forward direction when clockwise direction motor control 202 switches pulses of negative voltage to winding 208 and rotates in counterclockwise direction so as to drive the tape in a reverse direction when counterclockwise motor control 204 switches pulses of negative voltage to winding 206. Clockwise and counterclockwise motor controls 202 and 204 are similar and are operated as high frequency switches during negative portions of each cycle of the signals appearing on lines 41 or 42. Accordingly, the width of 60 volt pulses applied to the motor windings varies in accordance with the potential of the error signal which is applied to clockwise and counterclockwise direction motor controls 202 and 204 by way of difference amplifier 164. The average current through the motor and the speed of the motor therefore depends upon the amplitude of the difference signal. The direction of rotation of the motor depends on which of motor control switches 202 and 204 are operated which in turn depends upon the polarity of the error signal. Accordingly, the direction and speed of the reel motor depends upon the amplitude and polarity of the difference signal.

Referring to FIG. 10, clockwise and counterclockwise motor controls 202 and 204 operate similarly, therefore only the operation of counterclockwise direction motor control 204 will be described. Assuming that the potential at terminal 180 is more positive than ground, PNP transistor 244 is conducting and therefore the output at base 245 of NPN transistor 246 is positive turning transistor 246 on. With transistor 246 on, the potential at base 247 of PNP transistor 248 is less than +60 volts thus turning on transistor 248 which in turn provides a 60 volts signal at base 249 of transistor 250 thus turning PNP transistor 250 off. Transistor 250 when in its off condition serves as an open switch to prevent connection of +60 volts power supply 124 to winding 206 of motor 32.

When the potential at terminal 180 is negative with respect to ground potential, transistor 244 is turned on, transistor 246 turned off, transistor 248 turned off, and transistor 250 turned on through resistor 251. Transistor 250 when in the on condition, serves as a closed switch for connecting +60 volts power supply 124 to winding 206 of motor 32. Thus, it is seen that the switch provided by counterclockwise direction motor control 204 connects power supply 124 to winding 206 for only negative portions of the input signal cycle time.

Referring to FIG. 12, waveform A shows that when terminal 180 at the output of difference amplifier 164 is at $-0.5\pm1.5$ volts the negative position of each cycle exists for two thirds of the cycle time. The voltage at terminal 252 at winding 206 of motor 32 appears as shown in waveform B of FIG. 12 directly below waveform A. Pulses with +60 volts amplitude are therefore provided to winding 206 which are equal in width to two-thirds of the cycle time of waveform A. Due to the inductive load of the motor, the motor responds to an average voltage of two-thirds of +60 volts or +40 volts D-C. Motor current is shown by means of waveform 256 of FIG. 12. The current is seen by waveform 256 to vary slightly positive in the time interval between the leading and trailing edge of each power pulse and slightly negative in the interval between the trailing edge of the previous pulse and the leading edge of the next voltage pulse.

Waveform A′ at terminals 180 or 182 as shown in FIG. 12 represents a variable potential varying from +1.5 to −1.5 volts and modulated ±1.5 volts at the frequency of reference oscillator 198 to illustrate how the voltage pulses of waveform B′ at terminals 252 and 253 vary in width. When waveform A′ is at +1.5 volts modulated +1.5 volts no part of waveform A′ reaches negative potential therefore no voltage pulses are supplied to motor winding 206. For the case where waveform A′ is at a potential of +0.75 volt ±1.5 volts, one-fourth of the waveform in each cycle time extends to a negative potential to provide +60 volts power pulses as shown in waveform B′ for a 25% duty cycle. Similarly, the pulse widths in waveform B′ increase in width and percentage of duty cycle as waveform A′ becomes more negative for a greater portion of each cycle time. Diodes 268 and 270 provide for reel motor coasting current and smooth the voltage variations resulting from the high inductive load of the reel motors.

Referring to FIG. 10, diodes 258 and 260 are connected to the collector circuits of transistors 246 and 262 of motor controls 204 and 202 respectively. The control electrodes of diodes 258 and 260 are connected to high/low detection logic 126. When high or low tape sensors 116–118 or 120–122 provide signals on lines 127 and 129 indicating a high or low tape condition, high/low tape logic 126 connects a ground potential to the base circuits of transistors 248 and 260 respectively. The ground potential lowers the base potential therefore turning on transistors 248 and 264 to prohibit current to the base of transistors 250 and 266. The +60 volts potential at the base keeps transistors 250 and 266 clamped to their off condition thereby preventing application of power pulses to motor windings 206 and 208 respectively.

Clockwise and counterclockwise direction motor control circuits 202 and 204 operate as transistor switches for switching +60 volts pulses to motor windings 208 and 206 respectively. A switch with high speed turn-on and turn-off characteristics results without use of silicon controlled rectifiers and thyratrons which require turn-off by a second signal after they have been switched on.

In summary, the tape handler reel control system of the invention detects and produces a continuously variable smooth signal representing the position of tape loops, detects abnormal high and low tape loop poistion excursions, and detects light source intensity variations in two adjacent continuously and uniformly illuminated loop bins. These detection operations are accomplished using a plurality of photoresponsive sensors without incorporation of complex illumination arrangements of a plurality of light sources or aperture passageways in the bin walls, light collimation, mechanically rotatable focusing elements or separate light sources for each loop bin.

Inexpensive reel motor speed control is obtained directly from the continuously variable signal representing the loop position by modifying the tape loop position error signal which is used to control the speed and direction of the reel motors in accordance with the rate of change of the loop position signal. The modified loop position error signal then controls the reel motor to accelerate or decelerate more rapidly without the use of external rate control tachometers to obtain a feedback signal representing motor speed.

Tape handler reel motor control through application of variable width pulses to the reel motor windings is accomplished by eliminating the use of silicon controlled rectifier and thyratron controls which require external turn-off signals.

A reel motor control system using photoresponsive sensors to detect tape loop poistion deviations from a desired loop position can be constructed in accordance with this invention to provide improved accuracy by using a tape loop bin which includes protection against ambient light effects on the photoresponsive sensors and loop position sensing which compensates for inaccuracies in loop position signals resulting from light source intensity variations.

While the principles of the invention have now been made clear in illustrative embodiments, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. In a tape transport wherein a length of tape is moved longitudinally into and out of means defining a storage space having an end with an entrance area and an opposite end, the combination comprising: a source of radiant energy; storage space means for receiving and temporarily storing a length of magnetic tape and positioned relative to said source to permit receiving continuous uniform radiant energy from said source throughout said storage space means; first sensor means positioned along said storage space means to respond to radiant energy between said length of tape and said opposite end of said storage space; and second sensor means, independent of said first sensor means, responsive to the intensity of said radiant energy received from said source and positioned relative to said source and adjacent to said storage space means to receive radiant energy from said source of the same intensity as received by said storage space means.

2. In a tape transport wherein a length of tape in the form of a loop is moved longitudinally in a buffering means including a plurality of walls forming a buffer bin having an open end and a closed end, the combination comprising: a source of light; said buffer bin positioned relative to said source of light to permit receiving continuous uniform light from said source throughout said buffer bin; first sensor means responsive to the intensity of said continuous uniform light throughout said buffer bin, said first sensor means positioned along said buffer bin to respond to light between said loop of tape and said closed end of said buffer bin; and second sensor means, independent of said first sensor means, responsive to the intensity of said light received from said source, said second sensor means positioned relative to said source and adjacent to said buffer bin to receive light from said source of the same intensity as received throughout said buffer bin.

3. The combination as defined in claim 2 wherein said sensor means are photoresponsive devices.

4. The combination as defined in claim 2 wherein said buffering means is a vacuum loop bin including means to evacuate the space between said loop and said closed end of said bin whereby the fluid pressure created holds said loop in said bin; and wherein said first sensor means are photoresistive devices including means for generating a signal the magnitude of which is proportional to the illumination area visible to said first sensor means and said second sensor means are photoresistor sensor means including means for generating a signal the magnitude of which is proportional to the intensity of said light received by said second sensor means.

5. The combination as defined in claim 2 wherein said source of light is a fluorescent lamp and sensor means are photoresponsive devices.

6. The combination as defined in claim 1 wherein said first sensing means includes means for generating a signal the magnitude of which is proportional to the radiation area visible to said first sensor means and said second sensing means including means for generating a signal the magnitude of which is proportional to the intensity of said radiant energy received by said second sensor means.

7. In a tape transport wherein a length of tape is moved longitudinally into and out of means defining a storage space having an end with an entrance area and an opposite end with said storage space positioned between a storage reel driven by a motor and capstan means for moving tape, apparatus for reel control comprising: a source of radiant energy; storage space means for receiving and temporarily storing a length of magnetic tape and positioned relative to said source to permit receiving continuous uniform radiant energy from said source throughout said storage space means; first sensor means positioned along said storage space means to respond to radiant energy between said length of tape and said opposite end of said storage space, said first sensor means including means for generating a length signal the magnitude of which is proportional to the radiation area visible to said first sensor means; second sensor means, independent of said first sensor means, responsive to the intensity of said radiant energy received from said source and positioned relative to said source and adjacent to said storage space means to receive radiant energy from said source of the same intensity as received by said storage space means, said second sensor means including means for generating a source intensity signal, the magnitude of which is proportional to the intensity of said radiant energy received from said source; signal generating means for producing a reference length signal representing a desired predetermined length of tape in said storage space; control means responsive to said source intensity signal and said reference length signal to modify said reference length signal in accordance with said source intensity signal to compensate for any variation in the intensity of radiant energy from said source, said control means including means responsive to said modified reference length signal and said length signal to generate an error signal proportional to the deviation between said referenec length signal and said length signal; motor power control means responsive to said error signal to energize said motor driving said reel in direction and amount depending on the polarity and magnitude of said error signal to change said length toward said predetermined length.

8. In a tape transport wherein a length of tape in the form of a loop is moved longitudinally in a buffering means including a plurality of walls forming a buffer bin having an open and a closed end, the combination comprising: a source of radiant energy; said buffer bin positioned relative to said source of radiant energy to permit receiving continuous uniform radiant energy from said source throughout said buffer bin; first sensor means responsive to the intensity of said continuous uniform radiant energy throughout said buffer bin, said first sensor means positioned along said buffer bin to respond to radiant energy between said loop of tape and said closed end of said buffer bin; said buffer bin including vacuum means to evacuate the space between said loop and said closed end of said bin to thereby draw said loop into said bin; and abnormal position sensor means independent of said first sensor means, positioned along said buffer bin responsive to the position of said tape loop in said bin for generating a signal in response to predetermined maximum and minimum tape loop positions.

9. The combination as defined in claim 8 wherein said source of radiant energy is a light source and said sensor means are photoresponsive devices.

10. The combination as defined in claim 8 wherein said source of radiant energy is a light source and said first sensor means and said abnormal position sensor means are photoresponsive devices including means for generating a signal the magnitude of which is proportional to the illumination area visible to said first sensor means and said abnormal position sensor means.

11. The combination as defined in claim 8 wherein said source of radiant energy is a fluorescent lamp and said sensor means are photoresponsive devices.

12. In a tape transport wherein a length of tape in the form of a loop is moved longitudinally in a buffering means including a plurality of walls forming a buffer bin having an open and a closed end with said buffer bin positioned between a storage reel driven by a motor and capstan means for moving tape, apparatus for reel control comprising: a source of radiant energy; said buffer bin positioned relative to said source of light to permit receiving continuous uniform light from said source throughout said buffer bin; first sensor means responsive to the intensity of said continuous uniform light throughout said buffer bin, said first sensor means positioned along said buffer bin to respond to light between said loop of tape and said closed end of said buffer bin, said first sensor means including means for generating a length signal the magnitude of which is proportional to the radiation area visible to said first sensor means; said buffer bin including vacuum means to evacuate the space between said loop and said closed end of said bin to thereby draw said loop into said bin; abnormal position sensor means, independent of said first sensor means, positioned along said buffer bin responsive to the position of said tape loop in said bin for generating an abnomal position signal in response to predetermined maximum and minimum tape loop positions; said abnormal position signal having a magnitude which is proportional to the radiation area visible to said abnormal position sensor means; signal generating means for producing a reference length signal representing a desired predetermined length of tape in said buffer bin; control means responsive to said reference length signal and said length signal to generate an error signal proportional to the deviation between said reference length signal and said length signal; motor control means responsive to said error signal to energize said motor driving said reel in direction and amount depending on the polarity and magnitude of said error signal to change said tape length toward said predetermined length, said motor control means including means responsive to said abnormal position signal to disable said motor control means.

13. In a tape transport wherein a length of tape is moved longitudinally into and out of a means defining a storage space, said storage space positioned between a storage reel driven by a motor and a capstan means for moving tape, apparatus for reel motor control comprising: sensing means responsive to changes of said length of magnetic tape in said storage space to produce a continuously variable length signal which is proportional to the length of tape in said storage space; signal generating means for producing a reference length signal representing a desired predetermined length of tape in said storage means; modulation signal generator means for producing a modulating potential; power supply means for supplying a constant amplitude potential; control means responsive to said length signal, said reference length signal and said modulating potential to produce a modulated error signal representing the deviation between said tape length and said predetermined length, said control means responsive to the rate of change of said length signal to modify said modulated error signal in accordance with said rate of change; motor power control means including switching means responsive to said modulated error signal and said constant amplitude potential to produce variable width pulses having an amplitude corresponding to said constant amplitude potential, said motor responding to said variable width pulses to rotate said reel in a direction and speed to maintain a tape length corresponding to said predetermined length.

14. The apparatus for reel motor control as defined in claim 13 wherein said sensing means are photoresponsive sensing means.

15. In a tape transport wherein a length of tape in the form of a loop is moved longitudinally in a buffering means including a plurality of walls forming a buffer bin having an open and a closed end, said buffer bin positioned between a storage reel driven by a motor and a capstan means for moving tape, apparatus for reel motor control comprising: sensing means responsive to changes in the position of said magnetic tape loop in said buffer bin to produce a continuously variable position signal which is proportional to the position of said loop in said buffer bin; signal generating means for producing a reference position signal representing a desired predetermined position of said loop in said buffer bin; modulation signal generator means for producing a modulating potential; power supply means for supplying a constant amplitude potential; control means including a difference amplifier responsive to said position signal, said reference position signal and said modulating potential to produce a modulated position error signal representing the deviation between said loop position and said predetermined position, said difference amplifier including means responsive ot the rate of change of saids position signal to modify and modulated error signal in accordance with said rate of change; motor power control means including switching means responsive to said modulated error signal and said constant amplitude potential to produce variable width pulses having an amplitude corresponding to said constant amplitude potential, said motor responding to said variable width pulses to rotate said reel in direction and speed to maintain a tape loop position corresponding to said predetermined length.

16. In a tape transport wherein a length of tape in the form of two loops is moved longitudinally into and out of a means defining a separate storage space for each of said loops, each of said storage spaces storing for a separate loop and positioned between a different one of two storage reels each driven by a motor having a winding for clockwise and a winding for counterclockwise rotation and a capstan means for moving tape, apparatus for reel control comprising: signal generating means for producing a reference length signal representing a desired predetermined tape loop length in each of said storage spaces; modulation signal generator means for producing a modulating potential at a predetermined alternating potential; power supply means for supplying a constant amplitude potential; a control means for each of said reel motors comprising: sensing means responding to changes of said length of a magnetic tape loop in said separate storage space to produce a continuously variable length signal which is proportional to the tape loop length in said storage space; control means including difference amplifier means responsive to said reference length signal, said tape length signal and said modulating potential to produce two modulated tape length error signals having said predetermined alternating potential and frequency such that portions of each alternation for only one of said modulated length error signals may be negative at any given time, said control means difference amplifier including means responsive to the rate of change of said tape length signal to modify said modulated error signal in accordance with said rate of change; motor power control means including separate clockwise and counterclockwise motor power control means each responsive to a different one of said modulated error signals, each of said motor power control means including switching means responsive to one of said modulated error signals to switch power from said power supply for any negative portion of each cycle to a corresponding clockwise or counterclockwise winding to energize said motor in direction and speed to rotate said reel for changing said tape loop length toward said predetermined length.

17. In a tape transport, the combination comprising: storage space means for receiving and temporarily storing a length of magnetic tape, said storage space means including a plurality of walls and having an open and closed end, said tape entering and leaving through said open end; a source of radiant energy; radiant energy diffusing means comprising a panel of semitransparent material forming a longitudinal wall of said storage space for diffusing the radiant energy of said source, said longitudinal wall positioned adjacent said source of radiant energy to provide continuous uniform radiant energy from said source throughout said storage space means.

18. In a tape transport, the combination comprising: a source of radiant energy; storage space means for receiving and temporarily storing a length of magnetic tape, said storage space means including a plurality of walls and having an open and closed end, said tape entering and leaving through said open end and said storage space positioned to permit receiving continuous uniform radiant energy from said source throughout said storage space means and exposed to receive ambient radiant energy from sources external to said tape transport; ambient radiant energy protection means including a panel of transparent tinted material forming a longitudinal wall of said storage space, said longitudinal wall reducing the intensity of said ambient radiant energy entering said storage space means.

19. In a tape transport wherein a length of tape is moved longitudinally into and out of means defining a storage space having an end with an entrance area and an opposite end, the combination comprising: a source of radiant energy; storage space means for receiving and temporarily storing a length of magnetic tape and positioned relative to said source to permit receiving continuous uniform radiant energy from said source throughout said storage space means; sensor means including a plurality of sensing devices positioned along said storage space means to respond to radiant energy between said length of tape and said opposite end of said storage space, said plurality of sensing devices positioned such that the radiation areas visible to each of said sensing devices overlap.

20. In a tape transport wherein a length of tape is moved longitudinally into and out of means defining a storage space having an end with an entrance area and an opposite end, the combination comprising: a source of radiant energy; storage space means for receiving and temporarily storing a length of magnetic tape and positioned relative to said source to permit receiving continuous uniform radiant energy from said source throughout said storage space means; sensor means including a plurality of sensing devices positioned along said storage space means to respond to radiant energy between said length of tape and said opposite end of said storage space, said plurality of sensing devices positioned such that the radiation areas visible to each of said sensing devices overlap, each of said sensing devices including means to generate a signal which is proportional to the radiation area visible to each of said sensing devices; means connecting each sensing device in parallel, said parallel sensing devices providing a single signal which is proportional to the radiant energy between said length of tape and said opposite end of said storage space; signal summing means responsive to said single signal to provide a variable continuous signal which is proportional to said length of tape in said storage space.

21. The combination as defined in claim 20 wherein said source of radiant energy is a light source and said sensing devices are photoresponsive devices.

22. The combination as defined in claim 18 wherein said panel of transparent tinted material is a panel of tinted glass.

23. In a tape transport wherein a length of tape in the form of a loop is moved longitudinally in a buffering means including a plurality of walls forming a buffer bin having an open and a closed end, the combination comprising: a source of radiant energy; said buffer bin positioned relative to said source of radiant energy to permit receiving continuous uniform radiant energy from said source throughout said buffer bin; first sensor means responsive to the intensity of said continuous uniform radiant energy throughout said buffer bin, said first sensor means positioned along said buffer bin to respond to radiant energy between said loop of tape and said closed end of said buffer bin; said buffer bin including vacuum means to evacuate the space between said loop and said closed end of said bin to thereby draw said loop into said bin; and abnormal position sensor means independent of said first sensor means, positioned along said buffer bin responsive to the position of said tape loop in said bin for generating a signal in response to predetermined maximum and minimum tape loop positions; second sensor means, independent of said first sensor means, responsive to the intensity of said radiant energy received from said source and positioned relative to said source and adjacent to said buffer bin to receive radiant energy from said source of the same intensity as received by said buffer bin.

24. In a tape transport wherein a plurality of lengths of tape in the form of loops are moved longitudinally in a buffering means including a plurality of walls forming an individual buffer bin for each of said loops, said buffer bin having an open and a closed end, the combination comprising: a source of radiant energy; said buffer bin positioned relative to said source of radiant energy to permit receiving continuous uniform radiant energy from said source throughout said buffer bin; first sensor means responsive to the intensity of said continuous uniform radiant energy throughout said buffer bin, said first sensor means positioned along said buffer bin to respond to radiant energy between said loop of tape and said closed end of said buffer bin; said buffer bin including vacuum means to evacuate the space between said loop and said closed end of said bin to thereby draw said loop into said bin; and abnormal position sensor means independent of said first sensor means, positioned along said buffer bin responsive to the position of said tape loop in said bin for generating a signal in response to predetermined maximum and minimum tape loop positions; second sensor means, independent of said first sensor means, responsive to the intensity of said radiant energy received from said source and positioned relative to said source and adjacent to said buffer bin means to receive radiant energy from said source of the same intensity as received by said buffer bin.

25. In a tape transport, the combination comprising: storage space means for receiving and temporarily storing a length of magnetic tape, said storage space means including a plurality of walls and having an open and closed end, said tape entering and leaving through said open end; a source of radiant energy; radiant energy diffusing means comprising a panel of frosted glass forming a longitudinal wall of said storage space, said longitudinal wall positioned for exposure to said source of radiant energy to provide continuous uniform radiant energy from said source throughout said storage space means.

References Cited

UNITED STATES PATENTS 3,044,725 7/1962 Gams et al. ________ 242—55.12
3,226,551 12/1965 Campbell ___________ 250—206

LEONARD D. CHRISTIAN, *Primary Examiner.*